(12) United States Patent
Graville et al.

(10) Patent No.: US 7,354,564 B2
(45) Date of Patent: Apr. 8, 2008

(54) PARTIAL OXIDATION OF HYDROGEN SULPHIDE

(75) Inventors: Stephen Rhys Graville, Sheffield (GB); Jason Scott Norman, Hoboken, NJ (US)

(73) Assignee: The BOC Group, plc. (GB)

( * ) Notice: Subject to any disclaimer, the term of this patent is extended or adjusted under 35 U.S.C. 154(b) by 313 days.

(21) Appl. No.: 10/505,621

(22) PCT Filed: Feb. 20, 2003

(86) PCT No.: PCT/GB03/00729

§ 371 (c)(1), (2), (4) Date: Apr. 8, 2005

(87) PCT Pub. No.: WO03/070633

PCT Pub. Date: Aug. 28, 2003

(65) Prior Publication Data
US 2005/0180913 A1 Aug. 18, 2005

(30) Foreign Application Priority Data
Feb. 22, 2002 (GB) .................................. 0204224.0

(51) Int. Cl.
*C01B 17/04* (2006.01)
(52) U.S. Cl. .............................. 423/573.1; 423/576.8; 423/245.3

(58) Field of Classification Search ............. 423/573.1, 423/576.8, 245.3
See application file for complete search history.

(56) References Cited

U.S. PATENT DOCUMENTS

| 4,394,119 A | 7/1983 | Waller et al. |
| 4,933,163 A | 6/1990 | Fischer et al. |
| 6,495,117 B1 * | 12/2002 | Lynn ...................... 423/573.1 |
| 2002/0015675 A1 | 2/2002 | Watson et al. |
| 2003/0194366 A1 * | 10/2003 | Srinivas et al. ............. 423/230 |

* cited by examiner

*Primary Examiner*—Timothy C. Vanoy
(74) *Attorney, Agent, or Firm*—Philip H. Von Neida

(57) ABSTRACT

A method of conducting the partial oxidation to sulphur in at least one furnace of part of the hydrogen sulphide content of a feed gas mixture containing from 10 to 60% by volume of hydrogen sulphide but including at least one aromatic hydrocarbon impurity typically selected from benzene, xylene, toluene and ethyl benzene. A flame is created in the furnace. All the feed gas mixture is fed to the flame. Oxygen molecules are also fed to the flame. At last some of the oxygen molecules are supplied from a source of oxygen-enriched air to pure oxygen, and there is created in the flame at least one hot aromatic hydrocarbon impurity destruction region in which a substantial proportion, typically at least 75% by volume, of the aromatic hydrocarbon impurity is destroyed.

14 Claims, 3 Drawing Sheets

PARTIAL OXIDATION OF HYDROGEN SULPHIDE

BACKGROUND OF THE INVENTION

This invention relates to the partial oxidation of hydrogen sulphide, particularly the partial oxidation of hydrogen sulphide in a gas stream containing at least one aromatic hydrocarbon impurity.

Although aliphatic hydrocarbon impurities are easy to oxidise to carbon dioxide and water vapour in the combustion furnace or furnaces of a Claus process for the treatment of a feed gas containing hydrogen sulphide and are commonly encountered in such a process, aromatic impurities are not so simply oxidised. Benzene, toluene, xylene and ethyl benzene are common contaminants in Claus plant feed gases originating from some sources of natural gas or gas associated with oil deposits, the latter often being referred to as 'associated gas'. Difficulty arises in effectively destroying such aromatic hydrocarbon contaminants in a Claus process. Failure to remove the aromatic hydrocarbon impurities effectively leads to carbon and hydrocarbon contamination of the catalyst beds of the Claus plant with subsequent loss of catalytic activity and therefore to a reduced sulphur conversion, a reduced catalyst life, higher maintenance costs, and a need to change the catalyst on a regular basis.

U.S. Pat. No. 4,933,163 discloses that the feed gas to a Claus process can include hydrocarbons, but dose not identify them.

One known way of handling the problem of aromatic hydrocarbon impurities is to preheat the feed gas and the air, which supports combustion in the furnace of the Claus plant to a temperature in the range of 150 to 500° C. Preheating from outside the Claus plant is thermally inefficient and requires the use of direct-fired heaters or gas-to-gas heat exchangers. If the heat required for preheat is taken from the Claus plant itself, less steam is available for amine stripping in the refinery where the Claus plant is located and difficulties can arise when starting up the Claus plant.

Moreover, preheating is energy intensive and has a significant effect on the cost and complexity of the Claus plant. Further, if a preheating system is retrofitted to an existing burner/furnace configuration, the increase in gas volume to the burner may lead to consequential operational problems concerned with mixing and pressure drop.

In the light of these problems, the conventional method of dealing with aromatic hydrocarbon contaminants in a feed to a Claus plant is to add a considerable volume of aliphatic hydrocarbon gas, normally methane, to the Claus feed. However, such a measure significantly increases the size and cost of the Claus unit. If the added methane is not effectively burnt it too can add to problems with carbon deposition. The reducing nature of the gas compositions in the furnace also tends to result in higher carbon monoxide concentrations as a result of incomplete combustion of methane or other aliphatic hydrocarbon added to the feed gas. In addition high levels of carbon disulphide and carbonyl sulphide typically result from the combustion of methane and these impurities also tend to have a deleterious effect on the operation of the plant.

Indeed, particularly if the hydrogen sulphide content of the feed gas to the Claus plant is low, i.e. less than 40% by volume, an approach that is sometimes necessary is to upgrade the gas processing facilities so as to form a feed gas that has an enhanced hydrogen sulphide content. One option is to add an acid gas enrichment plant, but this is an expensive solution. Another option is to substitute in the absorption towers of an existing facility a more selective amine for the one previously used to absorb hydrogen sulphide. Such an option can lead however to an increased carbon dioxide level in the natural gas product of the facility. Such an increase in the carbon dioxide content of the natural gas product may however be commercially unacceptable.

It is therefore an aim of the present invention to provide a simpler but effective method of ensuring the treatment of aromatic hydrocarbon contaminants in a feed gas to a plant for the partial oxidation of hydrogen sulphide to sulphur.

SUMMARY OF THE INVENTION

According to the present invention there is provided a method of conducting the partial oxidation to sulphur in at least one furnace of part of the hydrogen sulphide content of a feed gas mixture containing from 10 to 60 mole % by volume of hydrogen sulphide but including at least one aromatic hydrocarbon impurity, comprising creating a flame in the furnace, feeding all the feed gas mixture to the flame, feeding oxygen molecules to the flame, wherein at least some of the oxygen molecules are supplied from a source of oxygen-enriched air or pure oxygen, and there is created in the flame at least one hot aromatic hydrocarbon impurity destruction region in which a substantial proportion and preferably the majority of the aromatic hydrocarbon impurity is destroyed.

We have surprisingly found that the rate of destruction of aromatic hydrocarbons in a Claus plant is particularly dependent on temperature. Thus, aromatic hydrocarbons such as benzene, toluene, xylene, and ethyl benzene are difficult to destroy at a temperature of 1000° C., but are effectively destroyed within two seconds at a temperature of 1100° C. Accordingly, the supply of oxygen-enriched air or pure oxygen can be selected to be at a rate and to a flame region that creates the necessary flame temperature for the destruction of a large proportion of the aromatic hydrocarbon(s) in an upstream region of the furnace.

The method according to the present invention offers a number of advantages. If the feed gas contains from 40 to 60% by volume (or mole %) of hydrogen sulphide, it can be treated by the method according to the invention without the need to preheat it or any source of oxygen molecules (and thus all the gas flowing into the furnace may enter it at a temperature of less than 100° C.) and without the need to add methane or other hydrocarbons to it. Further, if the feed gas contains from 10 to 40 mole % of hydrogen sulphide, there is no need to uprate its pre-treatment so as to increase its hydrogen sulphide, or to add methane or other hydrocarbons to it. A sufficient flame temperature for the destruction of the majority of the aromatic hydrocarbon contaminants in the upstream half of the furnace can be created by the method according to the invention, aided if necessary by preheating the feed gas mixture to a temperature typically in the range of 150 to 500° C. If desired, at least a part of the supply of oxygen molecules to the furnace may be preheated in addition or as an alternative to the preheating of the feed gas.

The method according to the present invention is particularly suited to the partial oxidation of a feed gas stream which includes from 10 to 60% by volume of hydrogen sulphide and up to 2% by volume of aromatic hydrocarbon contaminants, such as benzene, xylene, toluene, and ethyl benzene. The balance of the feed gas is typically mainly carbon dioxide.

The feed gas may additionally contain a minor proportion of water vapour, typically up to 5% by volume. Small amounts of other gaseous components, for example, nitrogen and argon may also be present in the feed gas. A small amount (up to 1% by volume) of methane may additionally be tolerated.

If the source of the feed gas is a refinery for processing natural gas or associated gas, the feed gas typically contains from 100 parts per million by volume to 1% by volume of aromatic hydrocarbon impurities.

Typically, the source of oxygen-enriched air or pure oxygen is not the only source of oxygen molecules for the partial oxidation of the hydrogen sulphide. Normally air from the atmosphere will also be supplied. Preferably, the flame is created by operation of a single burner. The burner may fire axially or tangentially into the furnace in which partial oxidation of hydrogen sulphide to sulphur vapour takes place. Preferably the oxygen-enriched air or the pure oxygen, on the one hand, and the air from the atmosphere on the other hand, are supplied separately to the burner.

The burner is preferably of a tip-mixed kind.

Preferably, the flame is staged. Staging of the flame enables one or more high temperature aromatic impurity destruction regions to be created in the flame at a temperature of at least 1400° C. without causing damage to the normally refractory-lined walls thereof, and without creating an unduly high temperature at the outlet of the furnace.

Preferably, the flame has a plurality of hot zones having a temperature of at least 1700° C.

Preferably, the exit temperature of the gas leaving the furnace is 1050° C. In general the higher the temperature of the hottest zone(s) of the flame, the lower the exit temperature that can be tolerated. Indeed by destroying at least 75% and preferably substantially all of the aromatic hydrocarbon impurities in the flame an exit temperature as low as 1000° C. could be tolerated.

A particularly suitable burner for use in the method according to the present invention is of the tip-mixed kind having a first central passage for the feed gas surrounded by a plurality of circumferentially disposed second outer passages for the feed gas, there being at least one oxygen passage disposed within each feed gas passage, and the plurality of circumferentially disposed second outer passages for hydrogen sulphide being disposed within an air passage, all the passages terminating at the burner tip. The advantage of such an arrangement is that it lends itself to precise control of the relative proportions of air and oxygen that are employed in the partial oxidation of the hydrogen sulphide, and it enables a plurality of high temperature zones to be created within the flame, while by supply of air from the atmosphere at an appropriate rate it ensures that excessive temperatures are not created at the furnace wails (which are typically refractory-lined) or at the exit from the furnace.

BRIEF DESCRIPTION OF THE DRAWINGS

The method according to the invention will now be described by way of example with reference to the accompanying drawings, in which:

FIGS. 1, 2 and 3 of the drawings are not to scale.

DETAILED DESCRIPTION OF THE INVENTION

Figure 1:
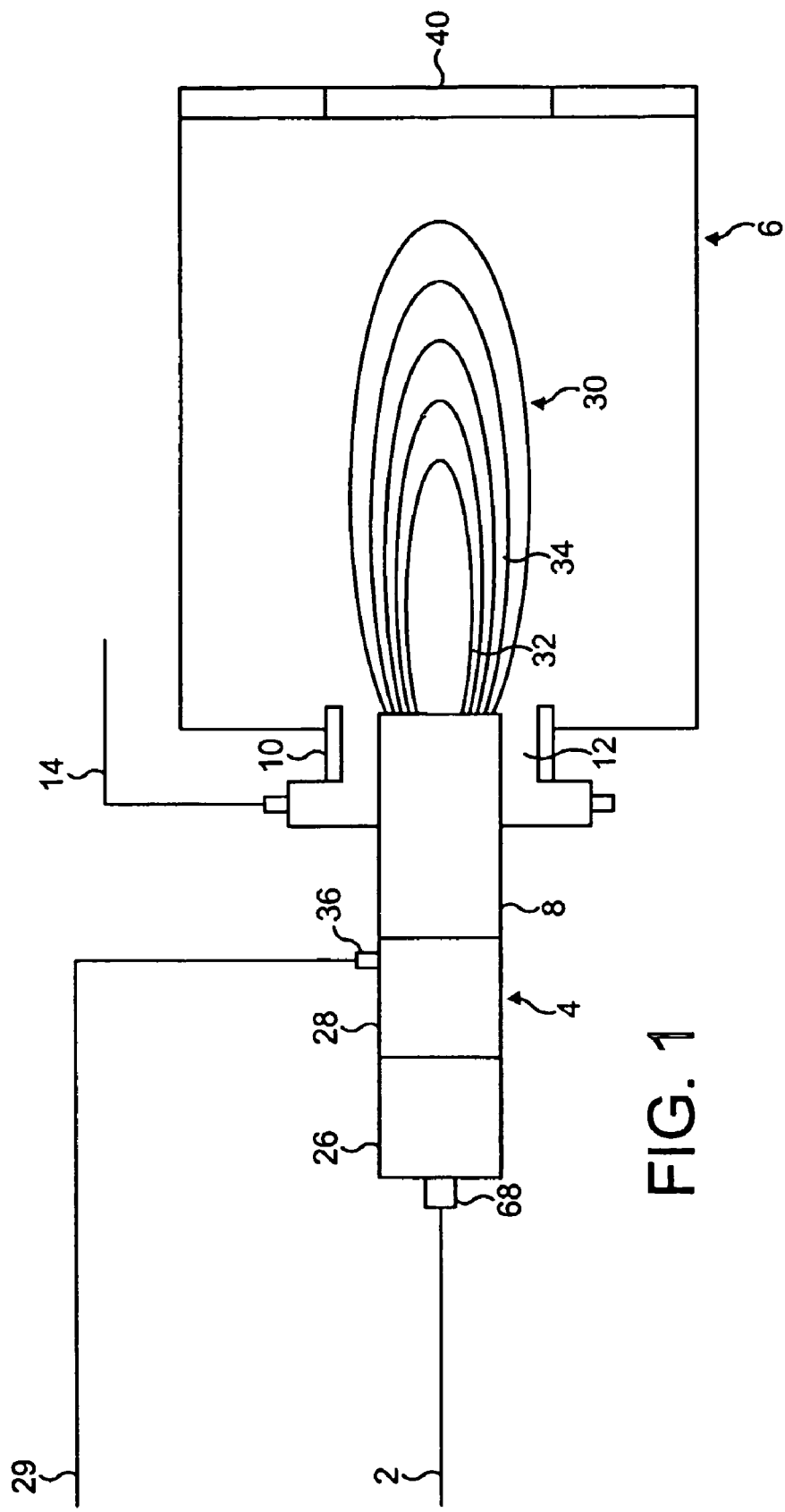
FIG. 1 is a schematic diagram of the furnace of a Claus plant.

Referring to FIG. 1 of the drawings, a pipeline 2 is provided for the flow of a waste acid gas stream from a gas refinery. The waste acid gas stream consists essentially of hydrogen sulphide and carbon dioxide. In addition, it may contain, for example, small amounts of nitrogen and argon and a small and possibly variable amount of water vapour. The hydrogen sulphide concentration in the acid gas stream is on a dry basis less than 60% by volume. It is typically in the range of 40 to 60% by volume. The acid gas stream additionally contains various aromatic hydrocarbon impurities, for example, benzene, toluene, xylene, and ethyl benzene. The total concentration of these impurities is usually less than 1% by volume of the acid gas stream (when measured on a dry basis).

The pipeline 2 terminates in a burner 4 which fires axially through one end of a furnace 6. The burner 4 and furnace 6 form part of a Claus plant for the partial oxidation to sulphur of the hydrogen sulphide content of the feed acid gas. The concentration of hydrogen sulphide in the feed acid gas is sufficiently low that difficulties arise in creating conditions in the furnace which ensure the destruction of the aromatic hydrocarbon impurities. Conventionally, therefore, either the feed gas is preheated, typically to a temperature in the order of 150° to 500° C., or methane is mixed from an external source with the feed acid gas in order to create the conditions suitable for the destruction of the aromatic hydrocarbon impurities. In accordance with the invention, however, neither of these measures is necessary and the feed gas passes from the pipeline 2 to the burner 4 at a temperature of less than 100° C., and typically in the range of 0 to 50° C. Further, no external source of aliphatic hydrocarbon is employed in steady state operation of the apparatus shown in FIG. 1. (If desired, however, some methane may be employed to start up the burner 4. A typical procedure is to establish a stable flame using methane or another aliphatic gaseous hydrocarbon in order to establish a flame and then to reduce and eventually cease the supply of methane while at the same time increasing the supply of the feed acid gas from zero to a desired steady state operating rate.)

It is not essential that the burner 4 fires axially into the furnace 6. Other arrangements are possible. For example, the burner 4 can be mounted to the side of the furnace 6 and fire tangentially into its interior.

As will be described below, the burner 4 is of a tip-mixed kind and has passages for the flow of commercially pure oxygen (or oxygen-enriched air) and has in addition to a first set of passages for the feed acid gas a second set of passages for commercially pure oxygen or oxygen-enriched air and a third passage for air unenriched in oxygen. An elongate longitudinally extending flame is formed in operation of the burner. The arrangement of the passages in the burner 4 is such that the flame has distinct stages.

The main reactions that take place in the furnace 6 are the combustion of hydrogen sulphide to water vapour and sulphur dioxide as represented by the formula:

$$2H_2S + 3O_2 \rightarrow 2H_2O + 2SO_2$$

and the Claus reaction in which the sulphur dioxide oxidises hydrogen sulphide to water vapour and sulphur vapour as represented by the equation:

$$2H_2S + SO_2 \rightarrow 2H_2O + 3S .$$

In view of this stoichiometry it is normally arranged that the rate of supply of oxygen molecules is that required to oxidise totally one third of the hydrogen sulphide content of the feed acid gas. The Claus reaction is not the only route by which sulphur vapour is formed. It is also formed by the thermal dissociation of hydrogen sulphide to hydrogen and sulphur vapour. A large number of other reactions take place. These include the formation of carbon disulphide ($CS_2$) and carbonyl sulphide (COS). In addition, there is the decomposition of the aromatic hydrocarbon impurities with which this invention is particularly concerned.

Various different reaction pathways are associated with the decomposition of the aromatic hydrocarbon impurities within the furnace 6. Since oxygen is present, the assumption that the aromatic hydrocarbons are oxidised to carbon dioxide is generally made. However, in the Claus process the oxygen supplied is always less than the stoichiometric amount required for full oxidation of all the oxidisable species present. Therefore reducing conditions prevail in the furnace 6. Furthermore, in the flame region of the furnace 6, the hydrogen, hydrogen sulphide and reactive radicals in the flame are competing for the available oxygen. As such, the relatively large aromatic molecules with associated large bond energies tend to fare badly in the competition for oxygen, resulting in a different set of reactions occurring to those of oxidation of the aromatic hydrocarbons. While the invention is not limited to the particular mechanism by which the aromatic hydrocarbons are destroyed, we believe that the predominant mechanism in the case of xylene, toluene and ethyl benzene is via thermal dissociation eventually to benzene, and then the pyrolysis/hydrolysis of benzene to form carbon monoxide and hydrogen. Examination of the various reaction enthalpies of the dissociation of the larger hydrocarbon molecules shows that xylene tends to have lower reaction enthalpies than toluene. Toluene, in turn, has lower reaction enthalpies than those associated with the relatively stable benzene ring. As a consequence, once sufficient energy is supplied to decompose xylene, benzene tends to be formed relatively quickly. In our experimental work, furnace sampling rarely showed any species other than benzene downstream of the main flame reaction front. The enthalpies of dissociation are set out in Table 1 below.

TABLE 1

Thermal Decomposition of Aromatic Hydrocarbons

| Parent Molecule | Reaction Products | $\Delta H_{298}$/kJmol$^{-1}$ |
|---|---|---|
| p-xylene | p-methyl-benzyl + H | 353.2 |
|  | $C_7H_7 + CH_3$ | 423.8 |
| toluene | benzyl + H | 356.1 |
|  | phenyl + $CH_3$ | 426.4 |
| benzene | phenyl + H | 464.2 |

Figure 4A:
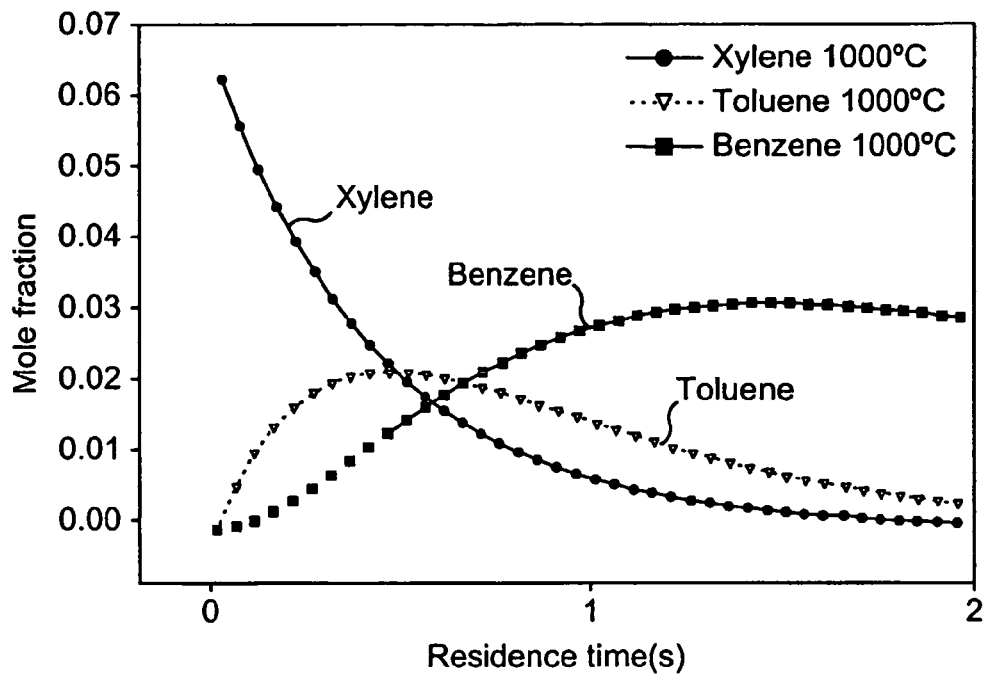
FIG. 4 is a graph illustrating the dependence on temperature of the destruction of aromatic hydrocarbons.
Figure 4B:
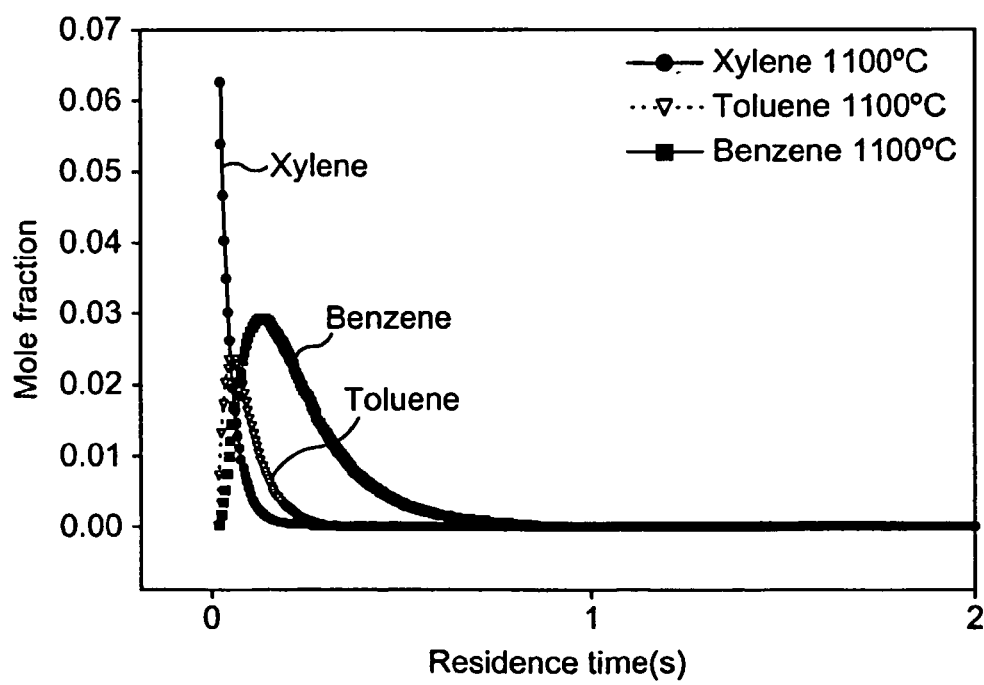

The kinetics of the destruction of various aromatic hydrocarbons by the mechanism described above was then calculated by means of a computer program at two different temperatures, namely 1000° C. and 1100° C. The results at 1100° C. are shown in FIG. 4(*a*) and at 1000° C. in FIG. 4(*b*). FIG. 4 clearly illustrates that a 100° C. change in operating temperature has a marked effect on the rates of destruction of the various aromatic hydrocarbon impurity. It was therefore concluded that if high temperatures could be generated in the flame region of the Claus furnace 6 complete destruction of the aromatic hydrocarbon impurities would be achieved even in conventional furnaces having a mean gas residence time in the order of 0.8 s, thereby eliminating the risk of these compounds causing damage to downstream Claus catalytic stages. (Such stages are used because the Claus reaction in the furnace 6 does not go to completion.) The key to this destruction is to employ the method according to the invention to ensure that most of the aromatic compounds are destroyed in the flame.

Figure 2:
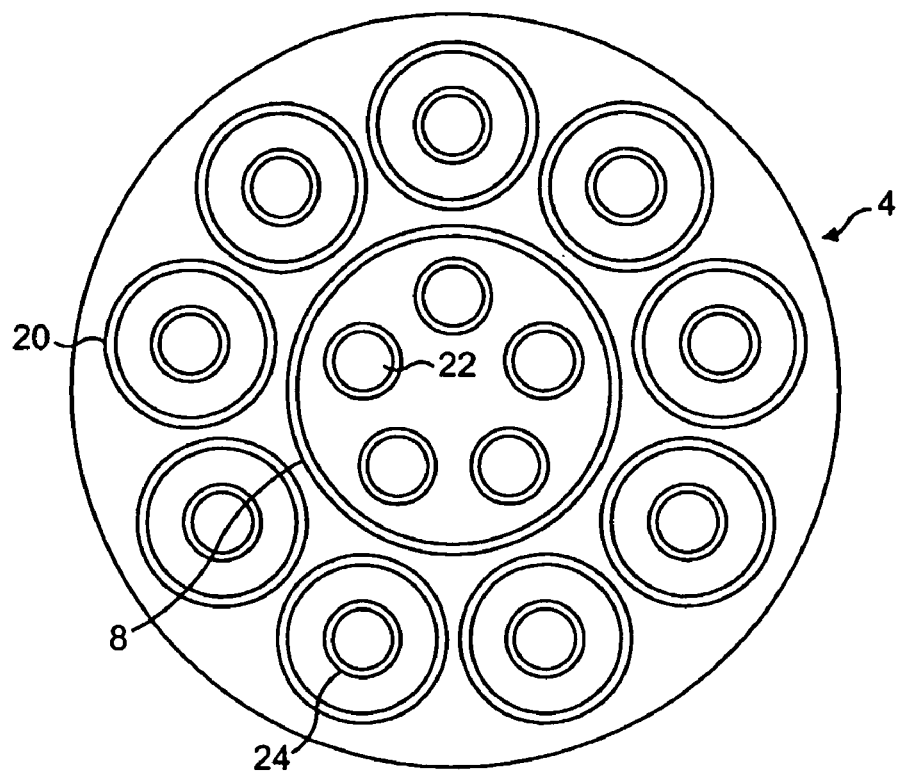
FIG. 2 is an end view of the burner that forms part of the furnace shown in FIG. 1.

In accordance with the invention, therefore, oxygen-enriched air or commercially pure oxygen is supplied to the flame created by operation of the burner 4 so as to create at least one and preferably a plurality of flame zones having a temperature of at least 1400° C. even though the gas outlet temperature from the furnace may be below 1100° C. Referring now to FIGS. 1 and 2, the burner 4 has an inner pipe or tube 8 whose distal end extends into a port or quarl 10 of the furnace 6. An annular passage 12 is defined between the distal end of the pipe or tube 8 and the port 10. Air is supplied via a pipeline 14 to the passage 12. Although not shown in FIG. 1, for ease of illustration, a multiplicity of pipes are located within or outside the tube or pipe 8. These pipes are shown in FIG. 2 which is an end view of the tip of the burner 4. The pipe 8 is provided for the supply of the feed acid gas and is surrounded by several circumferentially spaced outer pipes 20 also for the flow of feed acid gas. As shown in FIG. 2 there are eight such outer pipes 20, but different numbers of such pipes may, if desired, be employed. A plurality of oxygen pipes 22 each extend within the inner feed gas pipe 18. The axis of each oxygen pipe 22 is parallel to the axis of the feed gas pipe 18. In addition, each of the outer feed gas pipes 20 has a single oxygen pipe 24 extending therethrough. Each of the oxygen pipes 24 is coaxial with the feed gas pipe 20 in which it is located. Typically, all of the pipes 8, 20, 22 and 24 terminate at their distal ends in a common plane. All the feed gas pipes 8 and 20 communicate at the proximal ends with a feed gas chamber 26 (see FIG. 1) at the proximal end of the burner 4. The chamber 26 communicates with the pipeline 2 through which the feed acid gas is fed. Similarly, all the oxygen pipes 22 and 24 communicate at their proximal ends with an oxygen chamber 28 which is located towards the proximal end of the burner 4 and is supplied with commercially pure oxygen via a pipeline 29.

In operation, the oxygen leaves the pipes 22 and 24 at a velocity markedly different from that at which the feed gas leaves the pipes 18 and 20. The difference in velocities facilitates mixing of the oxygen and the hydrogen sulphide in the flame downstream of the tip or distal end of the burner 4 and results in the creation of an inner hot region 32 radially spaced from an outer hot region 34 within the flame 30 created by operation of the burner 4. Both the hot regions 32 and 34 of the flame 30. are formed such that they have a maximum temperature in excess of 1400° C., and typically in the order of at least 1700° C. On the other hand, by supplying air through the passage 12 to the outside region of the flame 30 the external flame temperature can be kept down such that no damage is done to the walls, normally lined with refractory, of the furnace 6. The length of the furnace 6 and the velocity at which the gases leave the burner 4 are chosen to be such that the mean residence time of the gas in the furnace 6 is preferably not less than 0.8 s. In addition, it is preferably arranged that the temperature of the effluent gas flowing through the outlet 40 of the furnace 6 is at least 1050° C. although where localised oxygen addition to form a staged flame is employed (as opposed to general enrichment of the air), lower exit temperatures may be tolerated. By the choice of the high temperature of the hot regions 32 and 34 of the flame 30, the residence time of the gas in the furnace 6, and its outlet temperature, it can be ensured that no aromatic hydrocarbons pass out of the furnace 6. Accordingly, the main components of the gaseous mixture leaving the furnace 6 are hydrogen sulphide, sulphur dioxide, hydrogen, sulphur vapour, carbon dioxide, water vapour and nitrogen. This gas mixture is typically treated conventionally in the rest of the Claus plant shown in FIG. 3.

Figure 3:
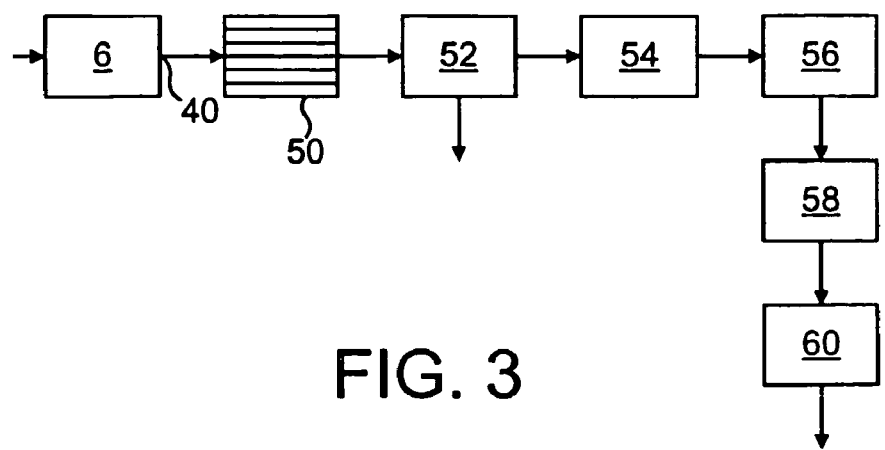
FIG. 3 is a schematic diagram of the rest of the Claus plant of which the furnace shown in FIG. 1 forms a part.

Referring to FIG. 3, the gas mixture leaving the furnace 6 through its outlet 40 passes through a waste heat boiler 50 so as to reduce its temperature to a little above the point at which sulphur vapour condenses. Downstream of the waste heat boiler 50, the gas mixture passes through a condenser 52 in which it is cooled to below the dew point of the sulphur vapour so as to form liquid sulphur. The liquid sulphur is collected in the condenser 52 and is passed to storage. The resulting gas mixture flows from the condenser 52 with a ratio of hydrogen sulphide to sulphur dioxide in the order of 2:1 through successive catalytic Claus stages, 54, 56 and 58. Each of the stages 54, 56 and 58 may in accordance with the general practice in the art comprise train of units consisting, in sequence, of a reheater (not shown) to raise the temperature of the gas mixture to a temperature suitable for catalytic reaction between hydrogen sulphide and sulphur dioxide, a catalytic reactor (not shown) in which hydrogen sulphide reacts with sulphur dioxide to form sulphur and water vapour, and a sulphur condenser (not shown). If desired, depending on the environmental standards which the plant shown in drawings is intended to meet, one or more of the catalytic stages 54, 56 and 58 may be omitted.

The gas mixture leaving the most downstream catalytic stage 58 may be subjected to any one of a number of known treatments rendering Claus process effluent suitable for discharge to the atmosphere. For example, the gas mixture may pass to a hydrolysis reactor 60 in which the components present in the gas mixture are subjected to hydrolysis and hydrogenation. In the reactor 60, any residual carbonyl sulphide and carbon disulphide are hydrolysed by water vapour to produce hydrogen sulphide. The hydrolysis reaction is performed over a catalyst, for example alumina impregnated with cobalt and molybdenum. Such catalysts are well known in the art. At the same time, residual elemental sulphur and sulphur dioxide are hydrogenated to form hydrogen sulphide. The hydrolysis and hydrogenation take place on the aforesaid impregnated alumina catalyst at a temperature in the range of 300 to 350° C. The resulting gas mixture consisting essentially of hydrogen sulphide, nitrogen, carbon dioxide, water vapour and hydrogen leaves the reactor 60 and flows to a first water condensation unit (not shown) and then to a separate unit (not shown) in which hydrogen sulphide is separated, for example by chemical absorption. A suitable chemical absorbent is methyl diethylamine. If desired, the hydrogen sulphide may be recycled to the furnace 6, for example by being mixed with the incoming hydrogen sulphide containing the gas stream.

Having thus described the invention, what we claim is:

1. A method of conducting the partial oxidation to sulphur in at least one furnace of part of the hydrogen sulphide content of a feed gas mixture containing from 10 to 60% by volume of hydrogen sulphide but including at least one aromatic hydrocarbon impurity, comprising creating a flame in the furnace, feeding all the feed gas mixture to the flame, feeding oxygen molecules to the flame, wherein at least some of the oxygen molecules are supplied from a source of oxygen-enriched air or pure oxygen, and there is created in the flame at least one hot aromatic hydrocarbon impurity destruction region having a temperature of at least 1400° C. in which a substantial proportion of the aromatic hydrocarbon impurity is destroyed.

2. The method as claimed in claim 1, in which the majority of the aromatic hydrocarbon impurity is destroyed in the flame.

3. The method as claimed in claim 2, in which at least 75% by volume of the aromatic hydrocarbon impurity is destroyed in the flame.

4. The method as claimed in claim 1, in which the feed gas contains up to 2% by volume of aromatic hydrocarbon impurities selected from the group consisting of benzene, xylene, toluene, and ethyl benzene.

5. The method as claimed in claim 1, in which the feed gas contains from 100 parts per million by volume to 1% by volume of aromatic hydrocarbon impurities.

6. The method as claimed in claim 1, in which the pure oxygen or oxygen-enriched air, on the one hand, and air from the atmosphere, on the other hand, are supplied separately to a burner which is operated to create the flame.

7. The method as claimed in claim 1, in which the flame has a plurality of hot regions.

8. The method as claimed in claim 7, in which there are two hot regions in the flame radially spaced from one another.

9. The method as claimed in claim 1, in which the flame is created by operation of a tip-mixed burner.

10. The method as claimed in claim 9, in which the burner has a first central passage for the feed gas surrounded by a plurality of circumferentially disposed second outer passages for the feed gas, there being at least one oxygen passage disposed within each feed gas passage, and the plurality of circumferentially disposed second outer passages for hydrogen sulphide being disposed within an air passage, all the passages terminating at the burner tip.

11. The method as claimed in claim 1, in which the mean residence time of the gas in the furnace is at least 0.8 seconds.

12. The method as claimed in claim 1, in which the exit temperature of the gas leaving the furnace is at least 1050° C.

13. The method as claimed in claim 1, in which the feed gas mixture contains from up to 60% by volume of hydrogen sulphide, and the feed gas mixture and the oxygen molecules are fed at a temperature in the range 0 to 100° C. to the flame.

14. The method as claimed in claim 1, in which the feed gas mixture contains from 10 to 40% by volume of hydrogen sulphide, and the feed gas mixture or the oxygen molecules, or both are preheated to a temperature in the range 150° C. to 500° C. upstream of the flame.

* * * * *